(12) United States Patent
Drozdz (10) Patent No.: US 9,677,417 B2
(45) Date of Patent: Jun. 13, 2017

(54) GAS TURBINE ENGINE

(71) Applicant: ROLLS-ROYCE PLC, London (GB)

(72) Inventor: Mickael Drozdz, Derby (GB)

(73) Assignee: ROLLS-ROYCE PLC, London (GB)

( * ) Notice: Subject to any disclaimer, the term of this patent is extended or adjusted under 35 U.S.C. 154(b) by 555 days.

(21) Appl. No.: 14/593,623

(22) Filed: Jan. 9, 2015

(65) Prior Publication Data

US 2016/0208640 A1    Jul. 21, 2016

(30) Foreign Application Priority Data

Feb. 3, 2014    (GB) .................................. 1401767.7

(51) Int. Cl.
*F01D 21/04*    (2006.01)
*F04D 29/52*    (2006.01)

(52) U.S. Cl.
CPC ......... *F01D 21/045* (2013.01); *F04D 29/526* (2013.01); *F05D 2220/36* (2013.01); *F05D 2240/14* (2013.01); *Y02T 50/672* (2013.01)

(58) Field of Classification Search
CPC ...... F01D 21/045; F01D 11/12; F01D 11/122; F01D 11/125; F01D 11/127; F02C 7/05
See application file for complete search history.

(56) References Cited

U.S. PATENT DOCUMENTS

| | | | |
|---|---|---|---|
| 5,823,739 A | 10/1998 | Van Duyn | |
| 7,255,528 B2 * | 8/2007 | Stretton | F01D 21/045 415/119 |
| 8,888,439 B2 * | 11/2014 | Harper | F01D 21/045 415/174.4 |
| 2005/0089391 A1 | 4/2005 | Stretton | |
| 2011/0076132 A1 | 3/2011 | Bottome | |
| 2012/0224949 A1 | 9/2012 | Harper et al. | |

(Continued)

FOREIGN PATENT DOCUMENTS

| | | |
|---|---|---|
| EP | 0816640 A1 | 1/1998 |
| EP | 2 495 400 A2 | 9/2012 |

(Continued)

OTHER PUBLICATIONS

Sep. 19, 2014 Search Report issued in British Patent Application No. GB1401767.7.

(Continued)

*Primary Examiner* — Dwayne J White
*Assistant Examiner* — Hoon Choi
(74) *Attorney, Agent, or Firm* — Oliff PLC (57) ABSTRACT

A fan containment system has a fan case having an annular casing element for encircling an array of fan blades and a hook projecting generally radially inwardly from the annular casing element. An annular fan track liner is positioned substantially coaxial to the annular casing element, and positioned such that a forward end of the fan track liner is axially spaced from the hook so that there is a gap between the hook and the fan track liner. A bridge member spans the gap between the hook and the fan track liner, wherein the bridge member is connected to the hook and contacts a radially inner surface of the forward end of the fan track liner. The bridge member fails when impacted by a fan blade released from a hub so that the released fan blade can impact the hook and be contained by the fan containment system.

20 Claims, 6 Drawing Sheets

(56) References Cited

U.S. PATENT DOCUMENTS

| | | |
|---|---|---|
| 2012/0224958 A1 | 9/2012 | Reed et al. |
| 2013/0136577 A1 | 5/2013 | Evans |
| 2013/0189095 A1 | 7/2013 | Harper et al. |
| 2014/0064949 A1 | 3/2014 | Evans et al. |
| 2014/0072426 A1 | 3/2014 | Evans |
| 2014/0227076 A1 | 8/2014 | Hoyland et al. |

FOREIGN PATENT DOCUMENTS

| | | |
|---|---|---|
| EP | 2 620 654 A1 | 7/2013 |
| EP | 2767676 A1 | 8/2014 |
| GB | 2407343 A | 4/2005 |

OTHER PUBLICATIONS

Jun. 26, 2015 Search Report issued in European Patent Application No. 15150592.

\* cited by examiner

GAS TURBINE ENGINE

FIELD OF INVENTION

The present invention relates to a fan containment system, a casing assembly, a fan and/or a gas turbine engine.

BACKGROUND

Turbofan gas turbine engines (which may be referred to simply as 'turbofans') are typically employed to power aircraft. Turbofans are particularly useful on commercial aircraft where fuel consumption is a primary concern. Typically a turbofan gas turbine engine will comprise an axial fan driven by an engine core. The engine core is generally made up of one or more turbines which drive respective compressors via coaxial shafts. The fan is usually driven directly off an additional lower pressure turbine in the engine core.

The fan comprises an array of radially extending fan blades mounted on a rotor and will usually provide, in current high bypass gas turbine engines, around seventy-five percent of the overall thrust generated by the gas turbine engine. The remaining portion of air from the fan is ingested by the engine core and is further compressed, combusted, accelerated and exhausted through a nozzle. The engine core exhaust mixes with the remaining portion of relatively high-volume, low-velocity air bypassing the engine core through a bypass duct.

To satisfy regulatory requirements, such engines are required to demonstrate that if part or all of a fan blade were to become detached from the remainder of the fan, that the detached parts are suitably captured within the engine containment system.

The fan is radially surrounded by a fan casing. It is known to provide the fan casing with a fan track liner and a containment system designed to contain any released blades or associated debris. Often, the fan track liner can form part of the fan containment system.

The fan track liner typically includes an annular layer of abradable material which surrounds the fan blades. During operation of the engine, the fan blades rotate freely within the fan track liner. At maximum speed the blades may cut a path into this abradable layer creating a seal against the fan casing and minimising air leakage around the blade tips during cruise. Further incursions can occur during gusts or take off rotations over time.

Swept fan blades are increasingly used in turbofan engines as they offer significant advantages in efficiency over conventional fan blades. Swept fan blades have a greater chord length at their central portion than conventional fan blades. This greater chord length means that ice that forms on a swept fan blade follows the same rearward and outward path as on a conventional fan blade but may reach a radially outer tip of the blade before it reaches the trailing edge. The ice will therefore be shed from the blade tip and may strike the fan track liner within the blade off zone (that is the region where a blade would contact the fan track liner in the event of a blade being detached from the fan).

A fan track liner used with a swept fan blade is therefore required to be strong enough to resist ice impact whilst allowing a detached fan blade to penetrate and be contained therewithin.

In recent years there has been a trend towards the use of lighter fan blades, which are typically either of hollow metal or of composite construction. These lighter fan blades have similar impact energy per unit area as an ice sheet, which makes it more difficult to devise a casing arrangement that will resist the passage of ice and yet not interfere with the trajectory of a released fan blade.

Figure 1:
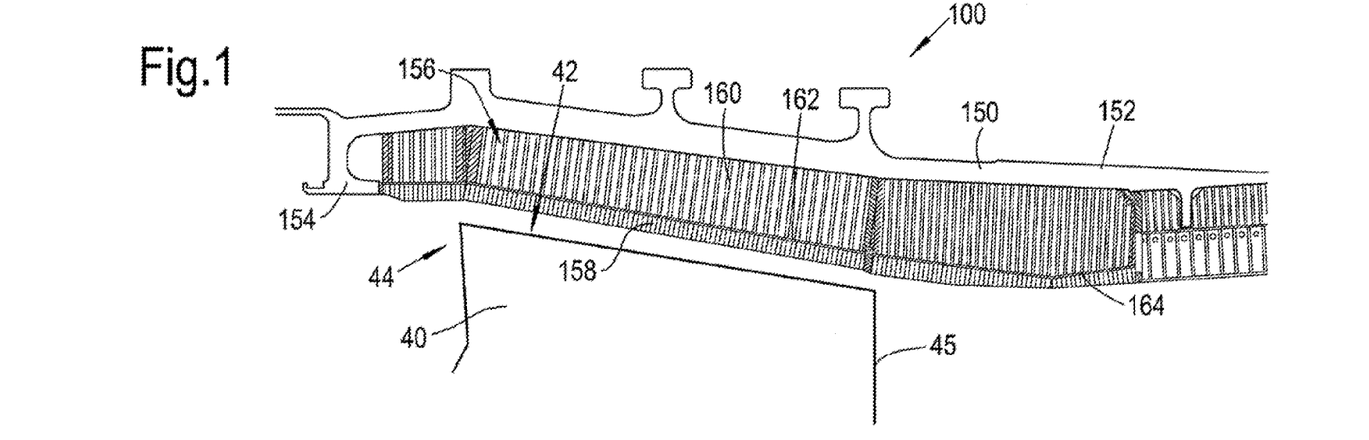
FIG. 1 illustrates a partial view of a cross-section through a typical fan case arrangement of a gas turbine engine of the prior art.

A conventional fan containment system or arrangement 100 is illustrated in FIG. 1 and surrounds a fan comprising an array of radially extending fan blades 40. Each fan blade 40 has a leading edge 44, a trailing edge 45 and fan blade tip 42. The fan containment arrangement 100 comprises a fan case 150. The fan case 150 has a generally frustoconical or cylindrical annular casing element 152 and a hook 154. The hook 154 is positioned axially forward of an array of radially extending fan blades 40. A fan track liner 156 is mechanically fixed or directly bonded to the fan case 150. The fan track liner 156 may be adhesively bonded to the fan case 150. The fan track liner 156 is provided as a structural intermediate to bridge a deliberate gap provided between the fan case 150 and the fan blade tip 42.

The fan track liner 156 has, in circumferential layers, an attrition liner 158 (also referred to as an abradable liner or an abradable layer), an intermediate layer which in this embodiment is a honeycomb layer 160, and a septum 162. The septum layer 162 acts as a bonding, separation, and load spreading layer between the attrition liner 158 and the honeycomb layer 160. The honeycomb layer 160 may be an aluminum honeycomb. The tips 42 of the fan blades 40 are intended to pass as close as possible to the attrition liner 158 when rotating. The attrition liner 158 is therefore designed to be abraded away by the fan blade tips 42 during abnormal operational movements of the fan blade 40 and to just touch during the extreme of normal operation to ensure the gap between the rotating fan blade tips 42 and the fan track liner 156 is as small as possible without wearing a trench in the attrition liner 158. During normal operations of the gas turbine engine, ordinary and expected movements of the fan blade 40 rotational envelope cause abrasion of the attrition liner 158. This allows the best possible seal between the fan blades 40 and the fan track liner 156 and so improves the effectiveness of the fan in driving air through the engine.

The purpose of the hook 154 is to ensure that, in the event that a fan blade 40 detaches from the rotor of the fan 12, the fan blade 40 will not be ejected through the front, or intake, of the gas turbine engine. If a fan blade is released from the fan, the fan blade will impact the fan track liner and impact the hook. The hook restrains the fan blade and a trailing blade (not shown) then forces the released blade rearwards where the released blade is contained. Thus the fan blade 40 is unable to cause damage to structures outside of the gas turbine engine casings.

As can be seen from FIG. 1, for the hook 154 to function effectively, a released fan blade 40 must penetrate the attrition liner 158 in order for its forward trajectory to intercept with the hook. If the attrition liner 158 is too hard then the released fan blade 40 may not sufficiently crush the fan track liner 156.

However, the fan track liner 156 must also be stiff enough to withstand the rigours of normal operation without sustaining damage. This means the fan track liner 156 must be strong enough to withstand ice and other foreign object impacts without exhibiting damage for example. Thus there is a design conflict, where on one hand the fan track liner 156 must be hard enough to remain undamaged during normal operation, for example when subjected to ice impacts, and on the other hand allow the tip 42 of the fan blade 40 to penetrate the attrition liner 158. It is a problem of balance in making the fan track liner 156 sufficiently hard enough to sustain foreign object impact, whilst at the same time, not be so hard as to alter the preferred hook-interception trajectory of a fan blade 40 released from the rotor. Ice that impacts the fan casing rearwards of the blade position is resisted by a reinforced rearward portion 164 of the fan track liner.

Figure 2:
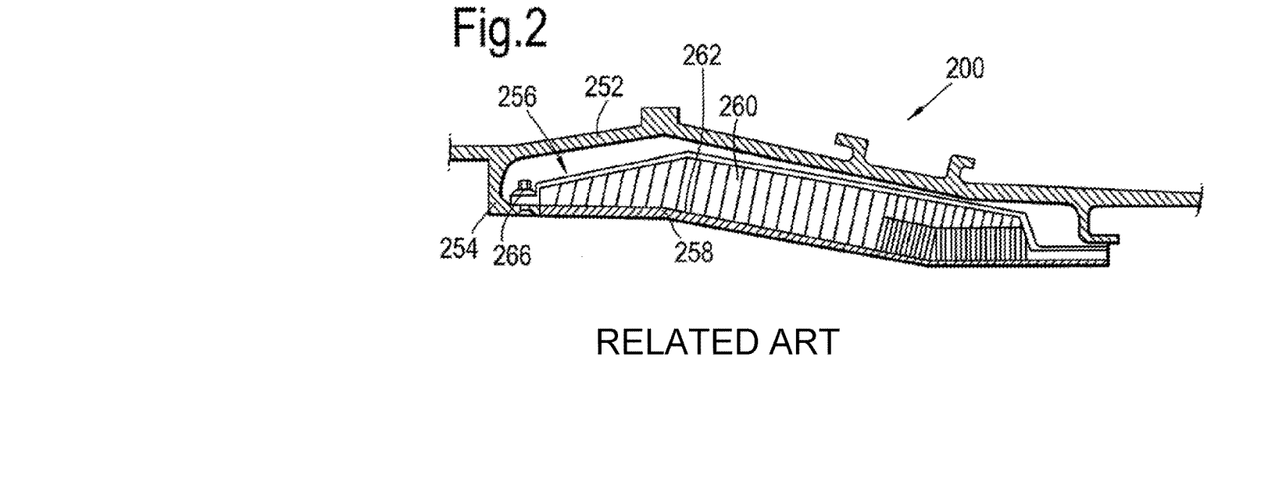
FIG. 2 illustrates a partial view of a cross-section through an alternative fan case arrangement of a gas turbine engine of the prior art.

An alternative fan containment system is indicated generally at 200 in FIG. 2. The fan containment system 200 includes a casing element 252, an attrition liner 258, a honeycomb layer 260, and a septum 262. The fan containment system 200 also includes a fan track liner 256 that is connected to the fan casing 250 at both an axially forward position and an axially rearward position. At the axially forward position, the fan track liner is connected to the casing at hook 254 via a fastener 266 that is configured to fail at a predetermined load. In the event of a fan blade detaching from the remainder of the fan, the fan blade impacts the fan track liner 256, the fastener 266 fails and the fan track liner pivots about a rearward point on the fan track liner. Such an arrangement is often referred to as a trap door arrangement. The trap door arrangement has been found to help balance the requirements for stiffness of the fan track liner with the requirements for resistance of operational impacts (e.g. ice impacts) ensuring a detached blade is held within the engine.

The fan track liner 256 of the trap door arrangement is usually formed using a plurality of adjacent arcuate panels. This has the advantage of ease of repair because only panels in the region of the damage need to be repaired. However, vibration of the panels can be a problem. The currently contemplated method of reducing or preventing vibration of the panels is to adhesively fix the panels together.

SUMMARY OF INVENTION

The present invention seeks to address one or more of the problems associated with fan containment systems of gas turbine engines of the prior art.

A first aspect of the invention provides a fan containment system for fitment around an array of radially extending fan blades mounted on a hub in an axial gas turbine engine. The fan containment system comprises a fan case having an annular casing element for encircling an array of fan blades and a hook projecting in a generally radially inward direction from the annular casing element and positioned axially forward of an array of fan blades (e.g. the hook is positioned nearer to an air intake of an engine than the array of fan blades) when the fan containment system is fitted around said fan blades. The fan containment system comprises an annular fan track liner positioned substantially coaxial to the annular casing element, and positioned such that a forward end of the fan track liner (i.e. an end of the fan track liner proximal to the hook) is axially spaced from the hook so that there is a gap between the hook and the fan track liner. A bridge member (e.g. an annular bridge member) spans the gap between the hook and the fan track liner. The bridge member is configured to fail when impacted by a fan blade released from a hub.

Failure of the bridge member permits the released fan blade to move radially outwardly as well as axially forwardly so that the fan blade impacts the hook. A trailing fan blade can then sweep the released fan blade to a region for containment.

Advantageously, provision of the bridge member means that the fan track liner can be constructed to have increased impact strength compared to fan track liners of the prior art. This means that there is likely to be less damage to the fan track liner in service. Furthermore, a greater impact energy level may be acceptable, reducing the maintenance requirements.

Further, the fan containment system of the first aspect provides more flexibility for the arrangement of the fan track liner, for example the fan track liner may comprise an acoustic panel or be acoustically treated in some other way.

The bridge member can be constructed so that it is easy to replace, thus simplifying maintenance of the fan containment system.

The bridge member may be configured to deform, crush and/or fracture when impacted by a fan blade released from the hub.

The bridge member may span the gap between the hook and the fan track liner near a gas washed side (i.e. a radially inner side) of the fan track liner.

The bridge member may be connected to the hook and contacts a radially inner surface of the forward end of the fan track liner.

The bridge member may be connected to the hook via a fastener.

The bridge member may apply a preload to the fan track liner. Preloading the bridge member against the fan track liner can contribute to reducing vibration of the bridge member.

A voidal region may be provided radially between the bridge member and the annular casing element. Provision of said voidal region contributes to reducing the weight of the fan containment system, and also provides a region into which a fan blade can move without needing to first crush a filler material.

The bridge member may comprise an annular plate. The annular plate may be positioned such that a radially inner surface of the annular plate forms part of a gas washed surface of the fan containment system (in such embodiments, a filler or coating material may be provided on a radially inner surface of the annulus plate; the filler or coating material forming the gas washed surface).

The annular plate may comprise a plurality of adjacent arcuate plates. Each arcuate plate may extend circumferentially by approximately 10 to 40°, for example 16 to 20°.

In the present application, a measure of circumferential extent refers to the arc of a sector having a radial centre substantially coincident with a longitudinal axis of the fan containment system (which is substantially coincident to the axis of rotation of the fan around which, in use, the fan containment system is arranged), the two radial sides of the sector extend from the radial centre to the position of the arc, and the angle between the two radial sides of the sector is the angle used to express the circumferential extent of the arc.

The bridge member may comprise a stiffening member. The stiffening member may be provided at a position radially outward from the annular plate (e.g. at a position between the annular plate and the annular casing element).

The stiffening member may comprise a plurality of spaced plate elements. The plate elements may be circumferentially spaced by approximately 2 to 8°, for example 4°.

The stiffening member may be made from a stiffer material than the material of the annular plate.

The stiffening member may be profiled so as to have increased stiffness compared to a flat plate made of the same material.

The stiffening member may include a region that curves radially outwardly towards the annular casing element.

The stiffening member may connect the bridge member to the hook.

The stiffening member may be connected to the annular plate via bonding.

Alternatively, the stiffening member may be connected to the annular plate by virtue of the stiffening member and annular plate being formed as a single component.

The stiffening member may be connected to the annular plate via a fastener.

A portion of the annular plate in a region of the fastener may be thicker than the remainder of the annular plate. Thickening of said region of the annular plate improves ice impact resistance of the bridge member, provides an attachment point for the stiffening member and increases stiffness of the bridge member in said thickened region (alternatively referred to as a support region).

The stiffening member may be arranged so as to be pivotable about the fastener at the hook when a fan blade impacts the bridge member. The stiffening member may be pivotable in a radial and/or a circumferential direction.

The bridge member may include a crushable forward portion. The crushable forward portion may have a cantilever arrangement, supported in a mid-region of the bridge member, for example the forward portion may be supported by the fastener and a thicker region (or support region) of the annular plate.

In the present application, mid-region refers to a region between the forward end and the rearward end; it is not limited to a central region.

The stiffening member may be connected to the annular plate at a position spaced from the hook so as to define the crushable forward portion.

Weakening features may be provided in the forward portion to promote crushing (e.g. deformation or failure) of the forward portion. The weakening features may be slots.

The bridge member may include a deformable or fracturable rear portion. The deformable or fracturable rear portion may have a cantilever arrangement, supported in a mid-region of the bridge member.

Weakening features may be provided in the rear portion to promote deformation or failure of the rear portion when impacted by a released fan blade. The weakening features may be slots.

An anti-wear material may be positioned between the bridge member and the fan track liner. At least a rear portion of the bridge member may be coated with an anti-wear material, for example poly-sulphide or a polyimide.

The fan track liner may be bonded to the annular casing element. Bonding or connecting the fan track liner to the annular casing element can improve vibration performance of the fan track liner panel.

A second aspect of the invention provides a fan containment system for fitment around an array of radially extending fan blades mounted on a hub in an axial gas turbine engine. The fan containment system comprises a fan case having an annular casing element for encircling an array of fan blades and a hook projecting in a generally radially inward direction from the annular casing element and positioned axially forward of an array of fan blades when the fan containment system is fitted around said fan blades. An annular fan track liner is positioned coaxial to the annular casing element, and positioned such that a forward end of the fan track liner is spaced from the hook so that there is a gap between the hook and the fan track liner. An annular plate spans the gap between the hook and the fan track liner. The annular plate is connected to the hook via a fastener and contacts a radially inner surface of the fan track liner.

A third aspect of the invention provides a fan casing comprising the fan containment system according to the first or second aspects.

A fourth aspect of the invention provides a fan comprising the fan containment system according to the first or second aspects.

A fifth aspect of the invention provides a gas turbine engine comprising the fan containment system according to the first or second aspects.

DESCRIPTION OF DRAWINGS

The invention will now be described, by way of example only, with reference to the accompanying drawings in which.

DETAILED DESCRIPTION

Figure 3:
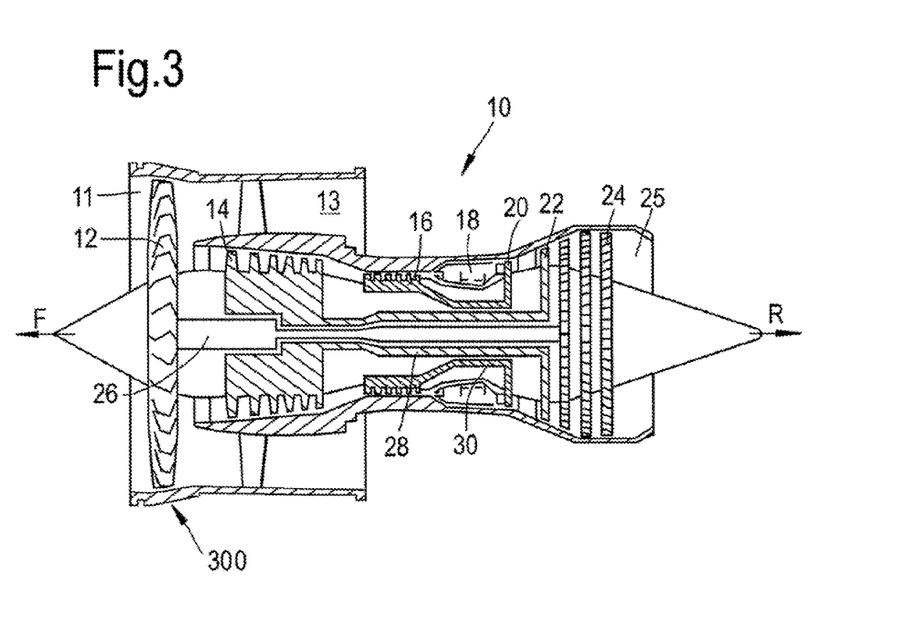
FIG. 3 illustrates a cross-section through the rotational axis of a high-bypass gas turbine engine.

With reference to FIG. 3 a bypass gas turbine engine is indicated at 10. The engine 10 comprises, in axial flow series, an air intake duct 11, fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 18, 20, 22 all rotate about the major axis of the gas turbine engine 10 and so define the axial direction of the gas turbine engine.

Air is drawn through the air intake duct 11 by the fan 12 where it is accelerated. A significant portion of the airflow is discharged through the bypass duct 13 generating a corresponding portion of the engine thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 generating the remainder of the engine thrust.

The intake fan 12 comprises an array of radially extending fan blades 40 that are mounted to the shaft 26. The shaft 26 may be considered a hub at the position where the fan blades 40 are mounted. FIG. 3 shows that the fan 12 is surrounded by a fan containment system 300 that also forms one wall or a part of the bypass duct 13.

In the present application a forward direction (indicated by arrow F in FIG. 3) and a rearward direction (indicated by arrow R in FIG. 3) are defined in terms of axial airflow through the engine 10.

Figure 4:
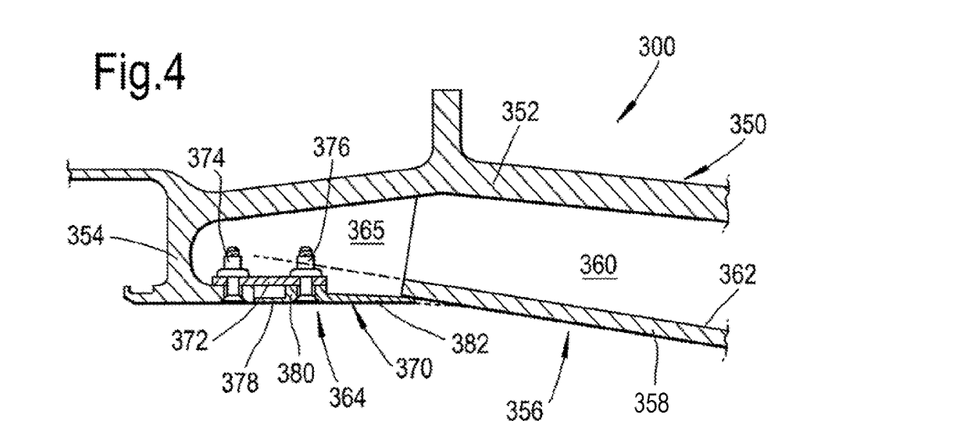
FIG. 4 illustrates a partial cross-section through a fan blade containment system.
Figure 5:
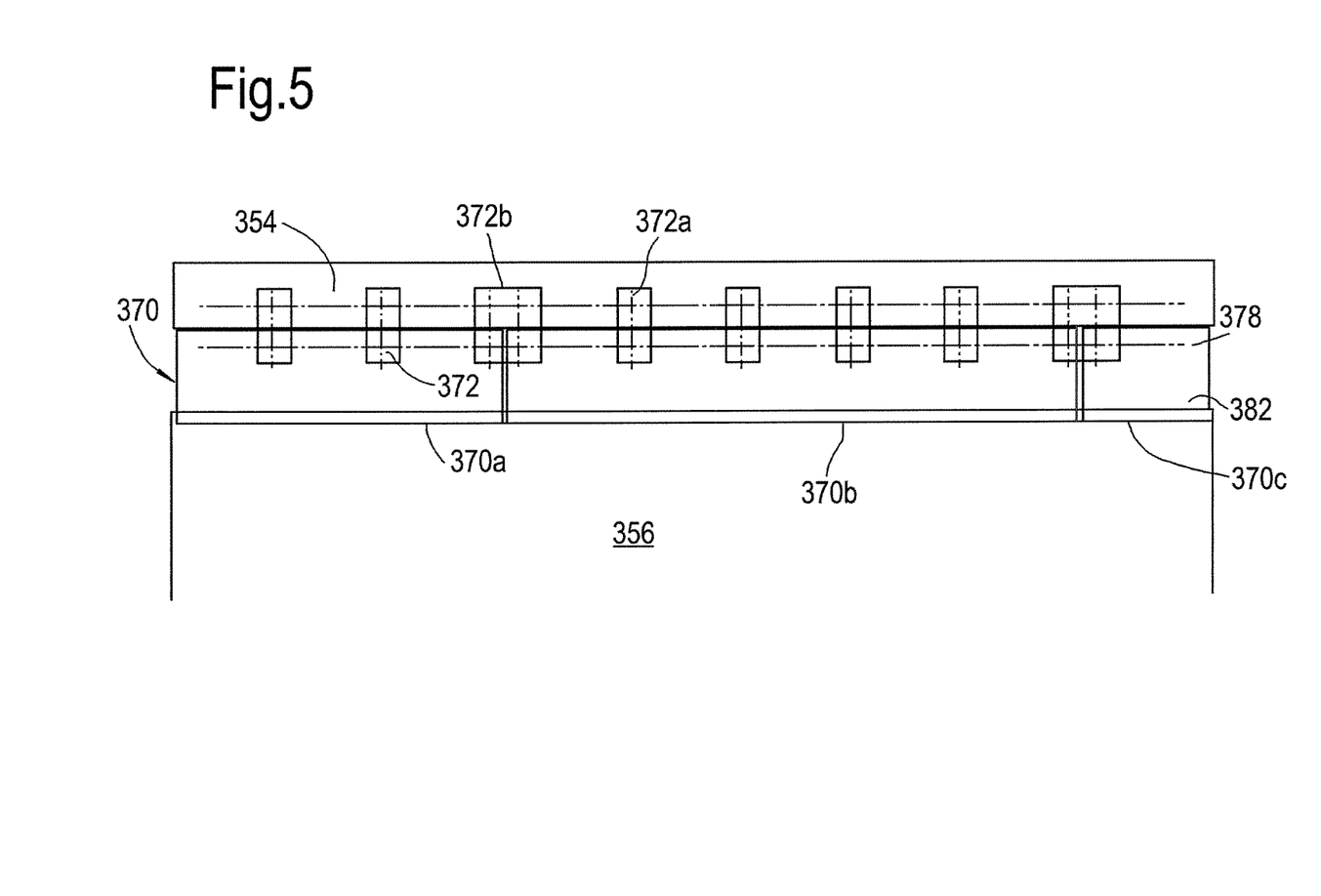
FIG. 5 illustrates a partial plan view of a non-gas washed surface of a hook, connector and fan track liner of the fan containment system of FIG. 4.
Figure 6:
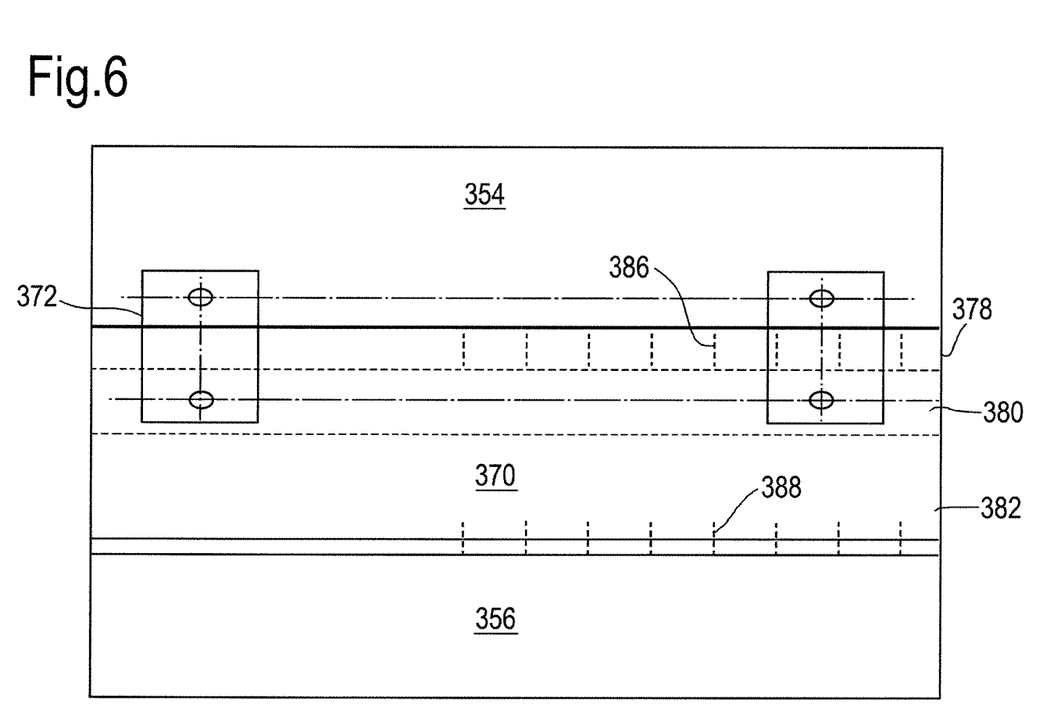
FIG. 6 illustrates a partial plan view of a non-gas washed surface of the hook, connector and fan track liner of the fan containment system of FIG. 4 showing slots provided in the connector.

Referring now to FIGS. 4 to 6, the fan containment system 300 is shown in more detail. The fan containment system 300 comprises a fan case 350. The fan case 350 includes an annular casing element 352 that, in use, encircles the fan blades (not shown in FIGS. 4 to 6 but indicated at 40 in FIG. 3) of the gas turbine engine (indicated at 10 in FIG. 3). The fan case 350 further includes a hook 354 that projects from the annular casing element in a generally radially inward direction. The hook 354 is positioned, in use, axially forward of the fan blades and the hook is arranged so as to extend axially inwardly, such that in a fan blade off scenario the hook 354 prevents the fan blade from exiting the engine through the air intake duct (indicated at 11 in FIG. 3).

In the present embodiment, the hook 354 is substantially L-shaped and has a radial component extending radially inwards from the annular casing element 352 and an axial component extending axially rearward towards the fan blades 40 from the radial component.

The fan track liner 356 includes an intermediate layer 360 that is connected (e.g. bonded) to the annular casing element 352. An attrition layer (or abradable layer) 358 is positioned, in use, proximal to the fan blades. In the present embodiments, a septum layer 362 is the interface between the attrition layer and the intermediate layer, forming part of the bond between the two. The septum layer 362 also separates the attrition layer and the intermediate layer and distributes any applied load between the attrition layer and the intermediate layer.

The fan track liner 356 is bonded to a radially inner surface of the annular casing element 352.

The fan track liner 356 is spaced from the hook 354 so as to form a gap between the hook and the fan track liner. An annular bridge member 364 spans the gap between the hook and the fan track liner on the side of a gas washed surface of the fan track liner. A voidal region 365 is defined between the annular casing element 352 and the bridge member 364; the voidal region is free from filler material or the like.

The bridge member 364 is connected at a forward end to the hook 354 via a plurality of fasteners 374, which in the present embodiment are bolts and lock nuts. However, in an alternative embodiment the bridge member may be clamped or bonded to the hook. A rearward end of the bridge member 364 abuts against a gas washed surface of a forward end of the fan track liner 356. A preload is applied to the fan track liner by the bridge member 364. The magnitude of the preload is set to be sufficient to limit vibration of the bridge member against the fan track liner. The person skilled in the art will understand what this preload should be for a given fan containment system, e.g. taking into consideration factors such as air pulsing from the fan blades.

An anti-wear material (e.g. a solid lubricant) is provided between the gas washed surface of the fan track liner 356 and the bridge member 364. In the present embodiment the anti-wear material is provided as a coating on the bridge member. The anti-wear material may be for example a poly-sulphide coating or a polyimide pad bonded to the surface liner, the polyimide may be Vespel® which is supplied by DuPont™.

The bridge member 364 includes an annular plate 370 and a stiffening element 372. The stiffening element 372 is provided at a radially outward position to the annular plate 370. A plurality of fasteners 374 connects the bridge member 364 to the hook 354 via the stiffening member 372.

The annular plate 370 is formed of a series of adjacent arcuate plates 370a, 370b and 370c positioned coaxially so as to form the annular plate 370. In the present embodiment each arcuate plate extends circumferentially by an angle equal to or between 16 and 20°, but in alternative embodiments the arcuate plates may be of an alternative length or the plates may be of varying lengths circumferentially around the fan track liner.

In the present embodiment, gaps are shown between adjacent arcuate plates 370a, 370b and 370c, these gaps will be filled with a filler material, for example polysulfide sealant. Alternatively, the length of the arcuate plates may be selected to minimise any gaps, or the arcuate plate may be provided as a single component.

In the present application, a distance represented as an angle refers to the distance of the arc of a sector having a centre substantially at the longitudinal centre of the fan containment system 300 and radial sides defining the extremities of the arc angled at the given angle. So for the above given example, the circumferential extent of each arcuate plate is the length of an arc of a segment having radial sides extending from the longitudinal axis of the fan containment system to the position of the arcuate plate, the radial sides being angled at 16° to 20° to each other.

The annular plate 370 has a thicker mid region 380 and a thinner forward region 378 and a thinner rearward region 382. The forward region and the rearward region include slots 386, 388 to weaken the said regions so as to promote deformation and/or failure when impacted by a fan blade. The slots 386, 388 extend from a forward or rearward end respectively towards a mid-region of the annular plate; the slots 386 extending to the mid region 380 and the slots 388 terminating before the mid-region. The length and spacing of the slots will depend on the materials used for the annular plate and the size and operating conditions of the fan. It will be apparent to a person skilled in the art how to define the length of the slots, e.g. using modeling techniques.

The stiffening element 372 is connected to the annular plate 370 at the mid-region 380 via a plurality of fasteners 376; in the present embodiment bolts and lock nuts. The connection of the annular plate to the stiffening element 372 means that the forward portion 378 and the rearward portion 382 have a cantilever configuration.

The stiffening element 372 is formed of a plurality of plates 372a, 372b (not all the plates are labelled to improve clarity) circumferentially spaced. Two types of plate are provided, narrow plates 372a and wider plates 372b. The wider plates are positioned to span between two adjacent annular plates 370a, 370b, 370c and connect to both of the adjacent annular plates via fasteners 376. The narrow plates are interspaced between the wider plates. In the present embodiment four narrow plates are provided between the wider plates, but in alternative embodiments more or less narrow plates may be provided. The use of narrow plates reduces the weight of the bridge member 364 and the use of the wider plates contributes to fixing one annular plate 370b to an adjacent annular plate 370a or 370c so as to limit vibration of the annular plates 370a, 370b and 370c. However, in alternative embodiments the supporting member may be a full annulus member or may be formed of plates of constant width, or the width of the plates may vary in a different manner to that described.

In the present embodiment the narrow plates have a width having a circumferential extent equal to or between 1 and 2°, and the wider plates have a width having a circumferential extent equal to or between 4 and 5°. However, it is clear to the person skilled in the art that in alternative embodiments the plates may have other suitable widths. The spacing between the plates in the present embodiment has approximately a circumferential extent of 4°, but in other embodiments any suitable spacing may be used. In the present embodiment the spacing is equal around the circumference but in alternative embodiments the spacing may be varied.

The annular plates may be made from a metallic or composite material, for example a glass or carbon reinforced composite material, or a metal such as titanium (or an alloy thereof). The stiffening element may also be made from a metallic or composite material, but preferably a metallic material, for example titanium or an alloy thereof.

Figure 7A:
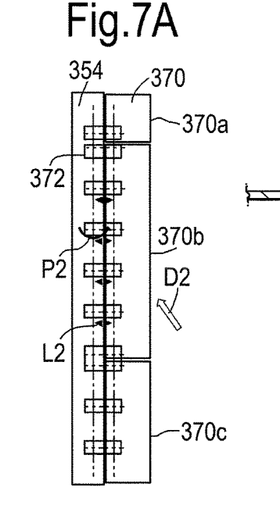
FIGS. 7A and 7B illustrate a partial cross-section though the fan blade containment system of FIG. 4 illustrating the forces applied during a fan blade off scenario.
Figure 7B:
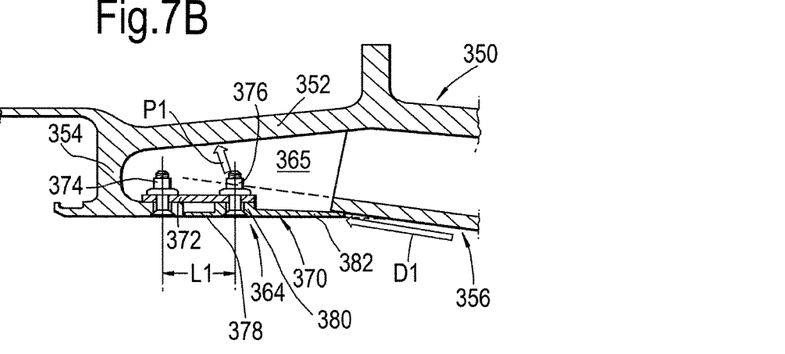
Figure 8A:
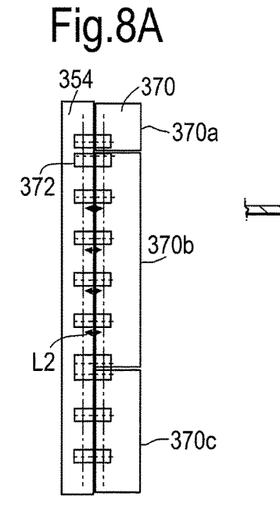
FIGS. 8A and 8B illustrate a partial cross-section through the fan blade containment system of FIG. 4 illustrating alternative forces applied during a fan blade off scenario.
Figure 8B:
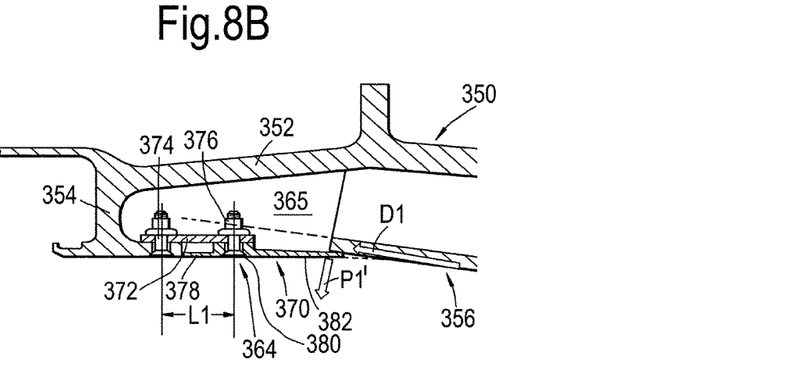

The operation of the fan containment system 300 in a fan blade off event will now be described. FIGS. 7A and 7B illustrate a first mode of operation and FIGS. 8A and 8B illustrate a second mode of operation.

Referring firstly to FIGS. 7A and 7B, when a fan blade is released from the remainder of the fan 12, the fan blade will move radially outwardly, axially forwards and circumferentially in the direction of rotation of the fan relative to the hub of the fan. Arrows D1 and D2 illustrate the general direction of travel of a fan blade in a fan blade off event. In the capture mode illustrated in FIGS. 7A and 7B, the released fan blade impacts the rearward end of the bridge member 364. Impact of the fan blade with the bridge member causes the bridge member to pivot towards the annular casing element 352 about the fastener 374, as indicated by arrow P1. At the same time, the support member pivots about a longitudinal axis of the fastener 374, as indicated by P2. The force applied to the bridge member by the fan blade also causes the forward region 378 of the annular plate 370 to crush. In some fan blade off events the rearward region 382 of the annular plate 370 will also be deformed due to the impact of the fan blade.

Movement and deformation of the bridge member 364 permits the released fan blade to move into the voidal region 365 and impact with the hook 354. The hook holds the fan blade and further axially forward movement is prevented. A trailing blade then forces the held released blade rearwards where the released blade is contained. Thus the fan blade is unable to cause damage to structures outside of the gas turbine engine casings.

The leverage of the bridge member (indicated at L1 in FIG. 7B and L2 in FIG. 7A) can be used to tune the response of the bridge member when contacted by a released fan blade (e.g. movement of the bridge member in the radial direction and/or movement of the support member about the axis of the fastener 374). Further the leverage of the bridge member can be used to tune the dynamic response of the annular plate and support member with an aim to avoid any resonances.

Referring now to FIGS. 8A and 8B, in an alternative mode of capture, a released fan blade impacts the bridge member and moves in a direction radially away from the annular casing, as illustrated by arrow P1'. The rearward portion of the annular plate deforms under the impact of the fan blade and the blade moves into the voidal region 365. In some embodiments the forward region of the annular plate may be crushed under the loads applied by the fan blade and the bridge member may rotate as described in the previous mode of capture. As previously described, movement and deformation of the bridge member 364 permits the released fan blade to move into the voidal region 365 and impact with the hook 354. The hook holds the fan blade and further axially forward movement is prevented. A trailing blade then forces the held released blade rearwards where the released blade is contained. Thus the fan blade is unable to cause damage to structures outside of the gas turbine engine casings.

Tests have shown the level of vibration of the bridge member to be limited and acceptable. Further, because the fan track liner is bonded to the fan case, vibration of the fan track liner is at an acceptable level.

The problem of the prior art fan containment systems of bonding the fan track liner to the fan case are mitigated because the filler material of the fan track liner is not required to deform, as with fan track liners of the prior art. This means that the fan track liner can be constructed to have increased impact strength compared to fan track liners of the prior art. This means that there is likely to be less damage to the fan track liner in service. Furthermore, a greater impact energy level may be acceptable, reducing the maintenance requirements.

Further, the described fan containment system provides more flexibility for the arrangement of the fan track liner, for example the fan track liner may comprise an acoustic panel or be acoustically treated in some other way.

The described bridge member is easy to replace so as to ease maintenance procedures.

Figure 9:
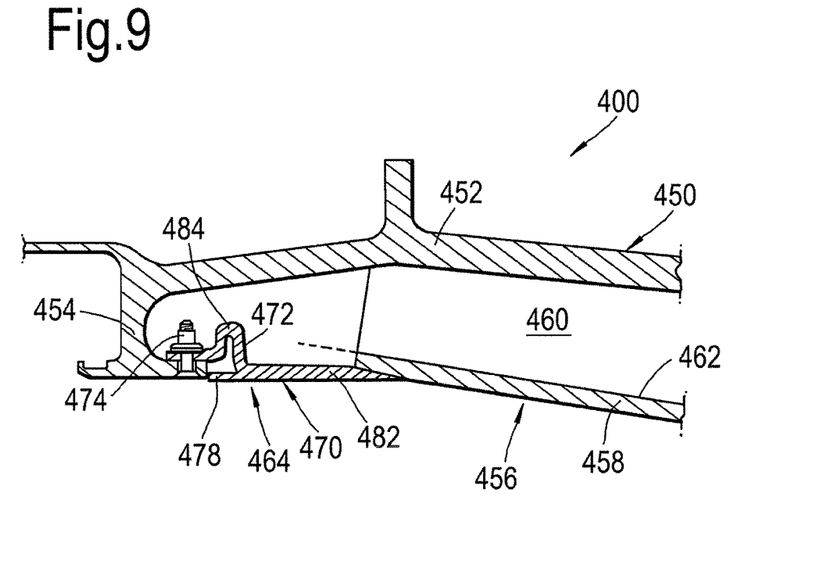
FIG. 9 illustrates a partial cross-section through an alternative fan blade containment system.

An alternative fan containment system is indicated generally at 400 in FIG. 9. The fan containment system of FIG. 9 is similar to the fan containment system of FIG. 4, and only the main differences will be described here. Similar features are given similar reference numerals but with a prefix "4" instead of "3". For example, reference numbers 450, 454, 456, 458, 460, 462, 474, 478, and 482 of FIG. 9 correspond to reference numbers 350, 354, 356, 358, 360, 362, 374, 378, and 382 of FIG. 4, respectively.

Similar to the embodiment of FIG. 4, the fan containment system 400 includes a bridge member 464. The bridge member includes an annular plate 470 and a stiffening member 472. However, the stiffening member 472 is bonded to the annular plate 470 instead of being connected to the annular plate via a fastener. Further, the stiffening member is made from a similar material as the annular plate 470 but is profiled to: increase the stiffness of the bridge member 464 in the circumferential direction so as to mitigate the risk of resonance frequencies between fastening points being met during operation; and to reduce the stiffness in the axial direction so as to permit the application of a pre-load between the bridge member and the fan track liner without damaging the bridge member or the fan track liner. The profiling is such that the stiffening member includes a portion that curves towards the annular casing element 452 and then away from the annular casing element, e.g. the profile includes a partial loop 484. In an alternative embodiment, the stiffening member may have a similar arrangement but the stiffening member and annular plate may be integrally formed.

The fan containment system of FIG. 9 operates to capture a released fan blade in a similar way to that described for the embodiment of FIG. 4.

While the invention has been described in conjunction with exemplary embodiments described above, many equivalent modifications and variations will be apparent to those skilled in the art when given this disclosure. Accordingly, the exemplary embodiments of the invention as set forth above are considered to be illustrative and not limiting. Various changes to the described embodiment may be made without departing from the scope of the invention.

For example, the fasteners used to connect the bridge member to the hook and/or to connect the stiffening member to the bridge member are not limited to a bolt and lock nut arrangement and any other type of suitable mechanical fastening may be used.

In the present embodiment the intermediate layer of the fan track liner is an aluminum honeycomb structure, but in alternative embodiments an alternative intermediate layer may be used (e.g. a foam, for example a metal or synthetic foam) or a honeycomb structure made from a material other than aluminum (for example a meta-aramid material)). The intermediate layer of the described embodiment is formed of the same material in a radial direction. However, in alternative embodiments, the intermediate layer may be formed of one or more radial layers (e.g. sub-layers) connected together via a septum layer. The radial layers may be of different densities, so as to vary the properties of the intermediate layer in a radial direction.

The described fan track liner is bonded to the annular casing, but in alternative embodiments the fan track liner may be mechanically fixed to the annular casing element.

In further alternative embodiments, the bridge member 364, 464 may be used with a fan track liner having a trap door arrangement; the configuration of a trapdoor arrangement is known to the person skilled in the art.

The invention claimed is:

1. A fan containment system for fitment around an array of radially extending fan blades mounted on a hub in an axial gas turbine engine, the fan containment system comprising:
   a fan case having an annular casing element for encircling an array of fan blades and a hook projecting in a generally radially inward direction from the annular casing element and positioned axially forward of an array of fan blades when the fan containment system is fitted around said fan blades;
   an annular fan track liner positioned substantially coaxial to the annular casing element, and positioned such that a forward end of the fan track liner is axially spaced from the hook so that there is a gap between the hook and the fan track liner; and
   a bridge member spanning the gap between the hook and the fan track liner;
   wherein the bridge member is configured to fail when impacted by a fan blade released from a hub so that the released fan blade can impact the hook and be contained by the fan containment system, wherein the bridge member is connected to the hook and contacts a radially inner surface of the forward end of the fan track liner.

2. The fan containment system according to claim 1, wherein the bridge member is connected to the hook via a fastener.

3. The fan containment system according to claim 1, wherein the bridge member is arranged so that the bridge member applies a preload to the fan track liner.

4. The fan containment system according to claim 1, wherein a voidal region is provided radially between the bridge member and the annular casing element.

5. The fan containment system according to claim 1, wherein the bridge member comprises a series of arcuate plates arranged to form an annular member.

6. The fan containment system according to claim 5, wherein the annular plate comprises a plurality of adjacent arcuate plates.

7. The fan containment system according to claim 5, wherein the bridge member comprises a stiffening member.

8. The fan containment system according to claim 7, wherein the stiffening member is provided radially outward from the annular plate.

9. The fan containment system according to claim 7, wherein the stiffening member comprises a plurality of spaced plate elements.

10. The fan containment system according to claim 7, wherein the stiffening member connects the bridge member to the hook.

11. The fan containment system according to claim 10, wherein the stiffening member is arranged so as to be pivotable about the fastener at the hook when a fan blade impacts the bridge member.

12. The fan containment system according to claim 1, wherein the bridge member includes a crushable forward portion.

13. The fan containment system according to claim 12, wherein the bridge member includes an annular or arcuate plate and a stiffening member and the stiffening member is connected to the plate at a position spaced from the hook so as to define the crushable forward portion.

14. The fan containment system according to claim 12, wherein weakening features are provided in the forward portion to promote crushing of the forward portion.

15. The fan containment system according to claim 1, wherein the bridge member includes a deformable rear portion.

16. The fan containment system according to claim 15, wherein weakening features are provided in the rear portion to promote deformation of the rear portion when impacted by a released fan blade.

17. The fan containment system according to claim 1, wherein an anti-wear material is positioned between the bridge member and the fan track liner.

18. The fan containment system according to claim 17, wherein at least a rear portion of the bridge member is coated with an anti-wear material.

19. A fan containment system for fitment around an array of radially extending fan blades mounted on a hub in an axial gas turbine engine, the fan containment system comprising:
   a fan case having an annular casing element for encircling an array of fan blades and a hook projecting in a generally radially inward direction from the annular casing element and positioned axially forward of an array of fan blades when the fan containment system is fitted around said fan blades;
   an annular fan track liner positioned coaxial to the annular casing element, and positioned such that a forward end of the fan track liner is spaced from the hook so that there is a gap between the hook and the fan track liner; and
   an annular member spanning the gap between the hook and the fan track liner;
   wherein the annular member is connected to the hook via a fastener and contacts a radially inner surface of the fan track liner.

20. A gas turbine engine comprising the fan containment system according to claim 1.

* * * * *